United States Patent [19]

Blake

[11] 4,180,346

[45] Dec. 25, 1979

[54] COUPLING FOR TELESCOPING MEMBERS

[75] Inventor: William J. Blake, Lombard, Ill.

[73] Assignee: Robert L. Swanson, Lombard, Ill.; a part interest

[21] Appl. No.: 885,963

[22] Filed: Mar. 13, 1978

[51] Int. Cl.² ............................................. F16B 7/10
[52] U.S. Cl. ................................... 403/109; 403/374; 24/122.3; 24/136 R
[58] Field of Search ............... 403/104, 106, 109, 166, 403/203, 227, 373, 374, 368; 24/122.3, 136 R, 263 SB, 115 M

[56] References Cited

U.S. PATENT DOCUMENTS

| | | | |
|---|---|---|---|
| 2,844,125 | 7/1958 | Wehn | 403/372 X |
| 3,649,054 | 3/1972 | McClenan | 403/374 X |
| 3,781,908 | 12/1973 | Tullos | 403/104 X |
| 3,965,543 | 6/1976 | Connors | 24/136 R |

*Primary Examiner*—Wayne L. Shedd
*Attorney, Agent, or Firm*—Merriam, Marshall & Bicknell

[57] ABSTRACT

An inner member is telescopically mounted within an outer tubular member and is normally locked against telescopic sliding movement relative to the outer member by a coupling mounted for back and forth manual manipulation along the outside of the two telescoping members at the location where the two members are coupled together. Manual manipulation of the coupling in one direction unlocks the inner member to permit sliding movement thereof relative to the outer member and the coupling, so long as the coupling is urged manually in the one direction. When the coupling is released, it automatically locks the inner member against further sliding movement.

12 Claims, 10 Drawing Figures

COUPLING FOR TELESCOPING MEMBERS

BACKGROUND OF THE INVENTION

The present invention relates generally to couplings for telescoping members, and more particularly to a coupling which may be readily and quickly manually manipulated to unlock the telescoping members for relative sliding movement or to lock them against such movement.

It is oftentimes desirable to provide pole-type devices with telescoping sections which permits the length of the pole to be increased or decreased. Telescoping pole-type devices usually comprise an outer tubular member within which slides a smaller-diameter member. Such devices include fishing poles or retrievers for recovering snagged fishing lures, golf ball retrievers and tripods.

Constructing these pole-type devices from telescoping sections permits the pole-type device to be contracted into a relatively short, compact length, for transporting, and to be extended into a relatively long length to fit the length requirements of the various uses to which the devices are put. In addition, it is oftentimes desirable, during a particular use, to increase or decrease the length of the pole-type device.

To facilitate lengthening and shortening of these pole-type devices, they are commonly provided with couplings which connect together the telescoping sections of the device. Typically, the coupling can be tightened to lock or hold the pole sections against telescoping movement relative to each other, and the coupling can be loosened to unlock the two telescoping sections and permit the smaller of the two to slide into or out of the larger section. Such couplings typically may employ threaded elements which are turned in one sense for tightening and locking purposes and turned in an opposite sense for loosening and unlocking purposes. Manipulation of these screw-type devices often requires a relatively longer period of time and more work than is desirable in situations where a quick pole length adjustment is dictated or is attractive.

SUMMARY OF THE INVENTION

The present invention provides a coupling for a pair of telescoping members, which coupling may be manipulated between a locking or tightened condition and an unlocking or loosened condition almost instantaneously. The inner or smaller diameter member is normally locked against telescopic sliding movement relative to the outer tubular member by the coupling which is mounted for back-and-forth manual manipulation along the outside of the two telescoping members at the location where they are coupled together. Manual manipulation of the coupling in one direction, e.g. by urging or pushing it in that direction, unlocks the inner member to permit sliding movement thereof relative to the outer tubular member and the coupling, so long as the coupling is urged manually in the one direction. When the coupling is released, it automatically reassumes its previous condition and locks the inner member against further sliding movement.

Other features and advantages are inherent in the structure claimed and disclosed or will become apparent to those skilled in the art from the following detailed description in conjunction with the accompanying diagrammatic drawing.

DETAILED DESCRIPTION OF THE DRAWINGS

Figure 1:
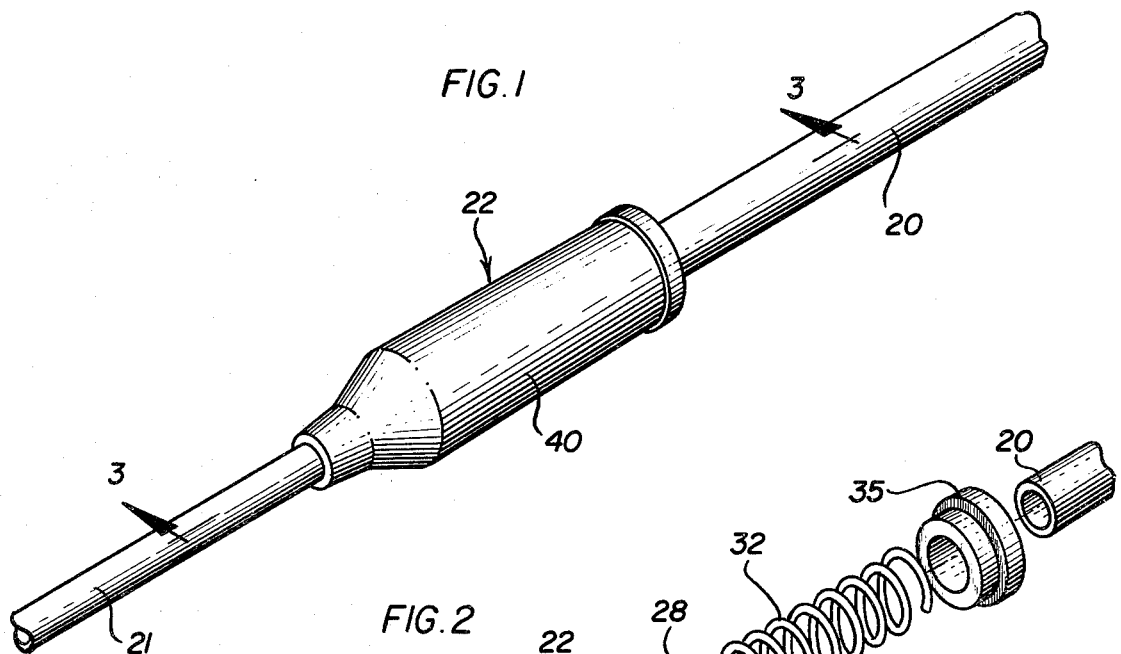
FIG. 1 is a perspective illustrating an embodiment of a coupling for telescoping members constructed in accordance with the present invention.

Referring initially to FIGS. 1-4, there is illustrated an outer tubular member 20 within which is telescopically mounted an inner tubular member 21, normally locked against telescopic sliding movement, relative to tubular member 20, by a coupling 22 mounted for back-and-forth or reciprocal manual manipulation along members 20, 21. Manual manipulation of coupling 22 in one direction (e.g., pushing it toward member 21) unlocks member 21 to permit sliding movement thereof relative to tubular member 20 and coupling 22. When coupling 22 is released, it automatically locks member 21 against further sliding movement, in a manner to be subsequently described in detail.

Figure 2:
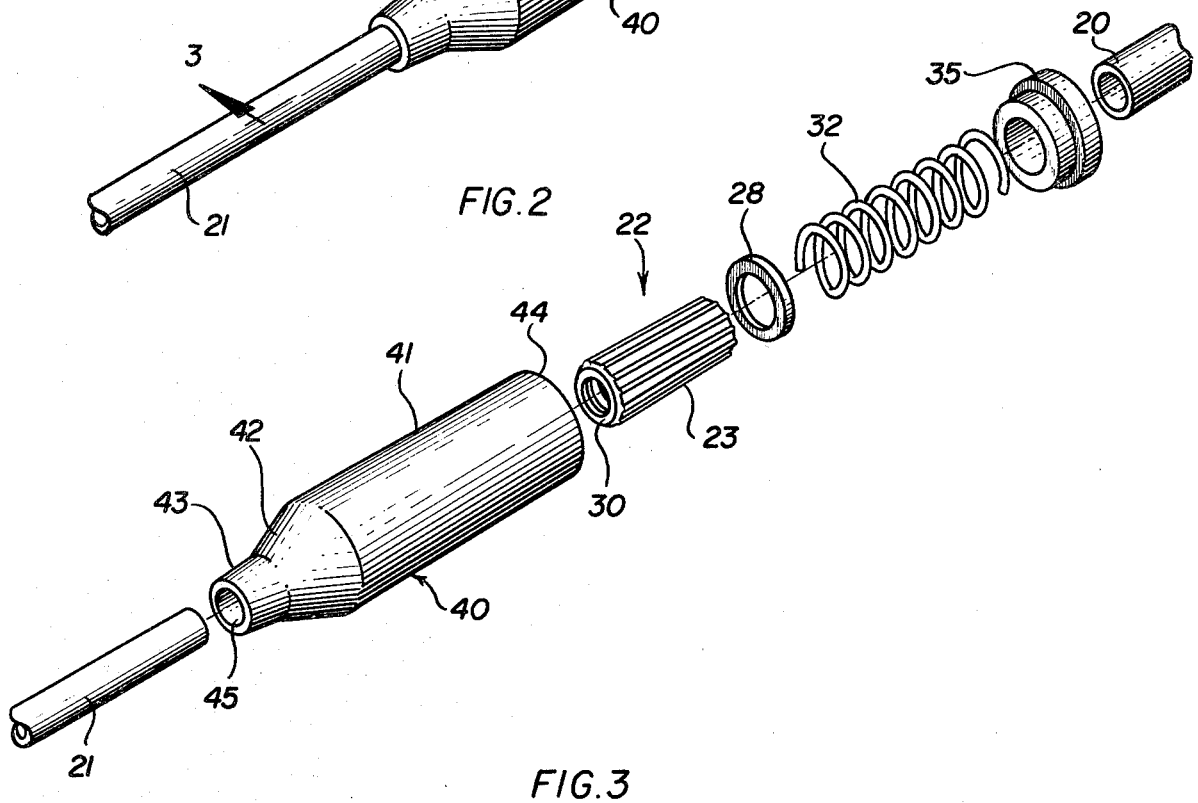
FIG. 2 is an exploded perspective of the embodiment of FIG. 1.
Figure 3:
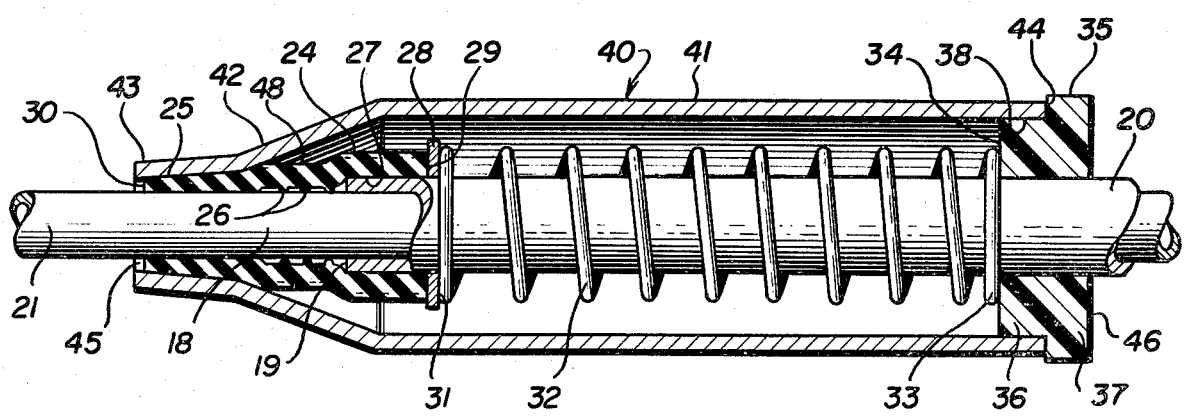
FIG. 3 is a sectional view taken along line 3—3 of FIG. 1 showing the coupling in a locking condition.
Figure 4:
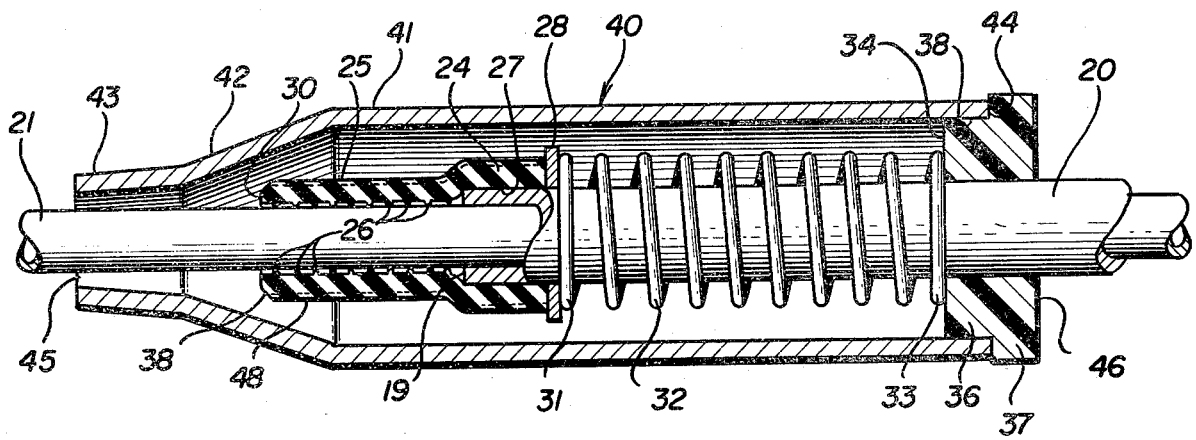
FIG. 4 is a sectional view similar to FIG. 3 but showing the coupling is a non-locking or loosened condition.

Referring to FIGS. 2-4, coupling 22 comprises a locking element 23 having a first portion 24 located around the outside of outer tubular member 20 adjacent one end 19 of member 20. Locking element 23 is composed of elastic material so that its first portion 24 assumes a stretched configuration (FIGS. 3-4) when the coupling and its locking element are in an assembled condition. Locking element 23 also includes a second portion 25 extending axially from first portion 24 and encompassing an untelescoped part 18 of inner member 21 adjacent end 19 of outer tubular member 20.

Referring to FIGS. 3-4 and 7-8, locking element second portion 25 comprises a plurality of interior circumferential ridges 26 for gripping member 21. Locking element 23 is held against movement in an axial direction relative to outer tubular member 20 and is adhered to the latter by adhesive located between the inner surface of locking element first portion 24 and the outer surface of tubular member 20, at 27. Locking element 23 has a pair of opposite ends 29, 30 each located around a respective one of tubular members 20, 21.

Engaging end 29 of locking element 23 is a washer 28 in turn engaged by one end 31 of a coil spring 32 disposed around outer tubular member 20 and having another end 33 engaged by the inner end 34 of an annular plug or cap 35 having a reduced portion 36 integral with an enlarged portion 37. Annular plug 35 is slidably mounted on tubular member 20. Washer 28 may be eliminated if locking element end 29 has sufficient area to engage coil spring end 31.

A tubular actuating element 40 is located around the outside of locking element 23 and is mounted for axial movement, relative to locking element 23, between first and second axially spaced positions thereof, illustrated in FIGS. 4 and 3, respectively. Actuating element 40 includes an enlarged cylindrical portion 41 integral with a tapered or frusto-conical intermediate portion 42 integral with a tapered or frusto-conical reduced end portion 43 terminating at an open end 45. Actuating element 40 also has an opposite open end defined by an edge 44. This last-described open end is located around outer tubular member 20 and is spaced from end 29 on locking element 23, in a direction away from the untelescoped part of inner tubular member 21.

Received within enlarged cylindrical portion 41 of actuating element 40 is reduced portion 36 of annular plug 35. The annular plug's enlarged portion 37 engages edge 44 of actuating element 40. Annular plug 35 is joined or adhered to cylindrical portion 21 by press fitting or with adhesive at edge 44 and at a location 38 between the inner surface of cylindrical portion 41 and the outer surface of reduced plug portion 36, as examples.

Enlarged cylindrical portion 41 of actuating element 40 is concentric with outer tubular member 20 and has a larger inside diameter than the outside diameter of tubular member 20 to accommodate coil spring 32 between the outer surface of outer tubular member 20 and the inner surface of cylindrical portion 41. Reduced portion 36 on annular plug 35 has an outside diameter less than the inside diameter of enlarged cylindrical portion 41 on the actuating element to enable the reduced portion 36 to engage end 33 of coil spring 32 within cylindrical portion 41.

Locking element 23, in the embodiment of FIGS. 1–4 and 7–10, is typically composed of elastically deformable material such as rubber or other elastomeric material. Accordingly, locking element second portion 25 and its gripping means 26 are elastically deformable between an operative, gripping disposition on inner tubular member 21 (FIG. 3) and an inoperative, non-gripping disposition (FIG. 4). Second portion 25 is normally urged, by the elastic nature of the material of which it is composed, to the inoperative, non-gripping disposition, illustrated in FIG. 4.

The locking element is urged into a gripping disposition, illustrated in FIG. 3, when the actuating element 40 moves in an axial direction from its first position, illustrated in FIG. 4, to its second position, illustrated in FIG. 3. When the actuating element so moves, the interior of its tapered, reduced end portion 43 engages and elastically deforms or compresses gripping means 26 into the operative disposition illustrated in FIG. 3. In this disposition, gripping means 26 grips inner member 21 to hold the latter against movement in an axial direction relative to locking element 23 and to outer tubular member 20.

In the preferred embodiment, actuating element 40 is normally urged toward its second position (FIG. 3) by the action of coil spring 32 pushing outwardly against annular plug 35 in turn fixed to actuating element 40 so that the latter moves with plug 35, to the right as viewed in FIGS. 3 and 4. As previously noted, locking element 23 is adhered to the outer surface of tubular member 20, at 27. Accordingly, the normal tendency of coil spring 32 to expand in an axial direction on tubular member 20, from the compressed condition illustrated in FIG. 4, cannot move locking element 23 relative to member 20, but will act to move only annular plug 35 and actuating element 40 adhered to plug 35.

To deactuate locking element 23, one merely manually grasps outer tubular member 20 behind annular plug 35 and pushes with the thumb, for example, against the outside surface 46 of the annular plug, to the left as viewed in FIGS. 3 and 4, thereby causing element 40 to move to the left from the position of FIG. 3 to the position of FIG. 4. This disengages the actuating element's tapered end portion 43 from the locking element's second portion 25, allowing the latter to expand and releasing the gripping action of gripping means 26 on tubular member 21.

Thus, when actuating element 40 is in the position illustrated in FIG. 4, inner tubular member 21 may be slidably moved into or out of outer tubular member 20 to adjust the combined lengths of the two tubular members. When the desired length has been achieved, actuating element 40 is released, and coil spring 32 automatically urges actuating element 40 from its first position (FIG. 4) toward its second position (FIG. 3), as described above. To assure that actuating element 40 is fully returned to its second position, it is helpful to pull element 40 (to the right as viewed in FIG. 4) and to rotate it slightly. This supplements the automatic action of coil spring 32 which normally urges element 40 to its second position. As actuating element 40 returns from its first to its second position, its tapered, reduced end portion 43 again engages second portion 25 on the locking element, elastically deforming the latter from the inoperative disposition indicated in FIG. 4 to the compressed, operative disposition illustrated in FIG. 3. Second portion 25 on the locking element has a slight chamfer 38 adjacent end 30 to facilitate entry of end 30 into reduced end portion 43.

As noted above, in the preferred embodiment, element 40 is urged to its second position by coil spring 32, with supplemental manual assistance when required. In other embodiments, coil spring 32 may be eliminated, and element 40 returned to its second position solely manually.

Figure 7:
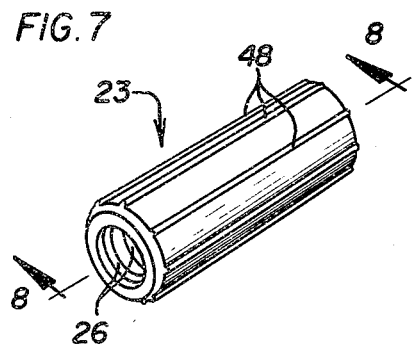
FIG. 7 is a perspective of another embodiment of a locking element.
Figure 8:
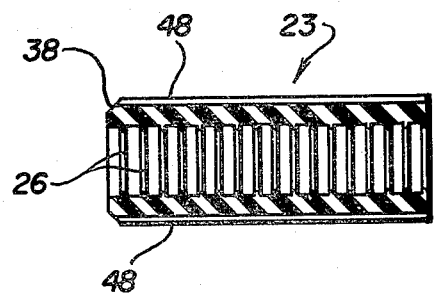
FIG. 8 is a sectional view taken along line 8—8 of FIG. 7.

FIGS. 7 and 8 illustrate the embodiment of locking element 23 utilized in connection with the coupling of FIGS. 1–4. This locking element 23 is composed of rubber or other elastomeric material, for example, and, in an unassembled condition, separate from the rest of the coupling, has essentially a cylindrical shape. Located on the inside of locking element 23 are a plurality of circumferential ridges 26, previously described. Located on the outside of cylindrical locking element 23 are a plurality of longitudinally extending ridges 48 engageable with tapered, reduced end portion 43 on the actuating element when the latter is in its second position (FIG. 3). Ridges 48 assure engagement of the outside of locking element 23 by the inside of reduced end portion 43, at regularly spaced locations around the entire periphery of locking element 23, thereby assuring radially inwardly directed compressive forces on the locking element's second or gripping portion 25 from a plurality of regularly spaced angles around the periphery of element 23.

Figure 9:
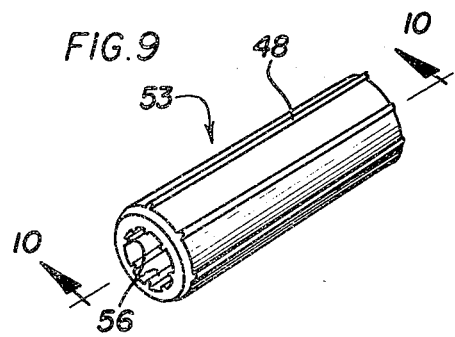
FIG. 9 is a perspective of a further embodiment of a locking element.
Figure 10:
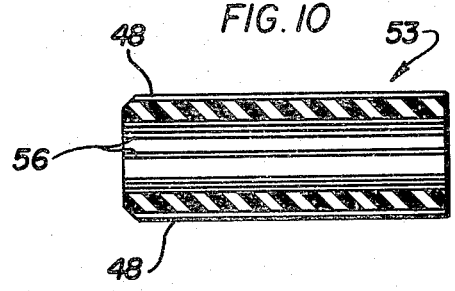
FIG. 10 is a sectional view taken along line 10—10 of FIG. 9.

Referring to FIGS. 9 and 10, the embodiment of locking element 53 illustrated therein may be composed of the same material as locking element 23 of FIGS. 7 and 8. The only difference between locking element 53 in FIGS. 9 and 10 and locking element 23 of FIGS. 7 and 8 is that, on the interior of locking element 53, the gripping ridges 56 extend longitudinally rather than circumferentially as the gripping ridges 26 on the locking element 23.

Figure 5:
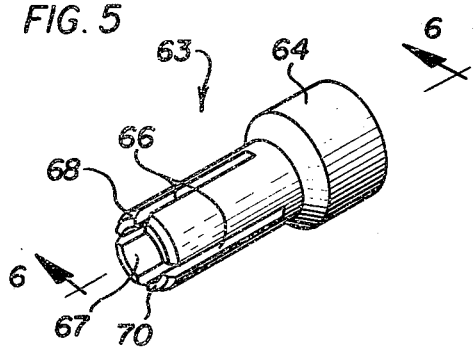
FIG. 5 is a perspective of one embodiment of a locking element for use in conjunction with the present invention.
Figure 6:
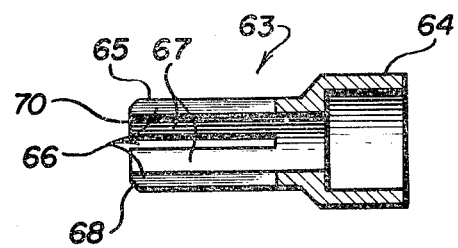
FIG. 6 is a sectional view taken along line 6—6 of FIG. 5.

In contrast to the locking elements of FIGS. 7-8 and 9-10, locking element 63 in FIGS. 5-6 is composed of a rigid, non-elastomeric, springable material, such as spring steel or a resilient non-ferrous alloy. Locking element 63 comprises a first cylindrical portion 64 normally located around and engaging the outside of outer tubular member 20, and a second cylindrical portion 65 normally encompassing the untelescoped part of inner tubular member 21. Second portion 65 comprises a plurality of elongated slots 66 extending longitudinally from an end 70 on second portion 65 of locking element 63. Longitudinal slots 66 define a plurality of fingers 67 which are contracted inwardly to engage and grip inner tubular member 21 when actuating element 40 is moved from its first position (FIG. 4) to its second position (FIG. 3). Second portion 65 on locking element 63 has a slight chamfer at 68 to facilitate entry of end 70 into the reduced end portion of the actuating element. When the actuating element is moved away from its second position in FIG. 3 to its first position in FIG. 4, the springable resilient nature of the material of which locking element 63 is composed causes the fingers 67 to release their gripping engagement with the inner tubular member 21 to permit the latter to move axially relative to outer tubular member 20 and with respect to locking element 63.

No matter which locking element 23, 53 or 63 is used, the rest of the structure of coupling 22 is essentially the same. Actuating element 40 is normally urged, by the action of coil spring 32 against annular plug 35, to its second or operative position illustrated in FIG. 3, in turn causing the locking element to grip inner tubular member 21 and prevent axial movement thereof relative to outer tubular member 20 and coupling 22. In all embodiments, the locking action of the locking element may be readily and quickly released merely by pushing the actuating element 40 to the left, as viewed in FIGS. 3 and 4. This permits a telescopic adjustment of the two tubular members 20, 21 until the desired combined length is achieved, whereupon the locking action of the locking element may be readily and quickly reestablished merely by releasing actuating element 41, as a result of which coil spring 32 will return the actuating element to its operative position.

The foregoing detailed description has been given for clearness of understanding only, and no unnecessary limitations should be understood therefrom, as modifications will be obvious to those skilled in the art.

What is claimed is:

1. In combination, an outer tubular member, an inner member telescopically slidable within said outer tubular member, and a coupling assembly for said members, said coupling assembly comprising:
   a tubular locking element having a first portion located around the outside of said outer tubular member adjacent one end of the outer tubular member;
   said tubular locking element having a second portion extending axially from said first portion and encompassing the untelescoped part of said inner member adjacent said one end of the outer tubular member;
   said tubular locking element having a pair of opposite ends and comprising a plurality of elongated ridges extending longitudinally on the outside of the tubular locking element between said opposite ends;
   gripping means, on said second portion of the tubular locking element, actuable between operative and inoperative dispositions thereof;
   a tubular actuating element located around the outside of said locking element;
   means on said actuating element for engaging said elongated ridges on the locking element to actuate said gripping means into an operative disposition in which said gripping means grips said inner member to hold the latter against movement in an axial direction relative to the locking element and the outer tubular member;
   said plurality of longitudinal ridges on said locking element comprising means, responsive to said engagement of said ridges by said means on said actuating element, for providing radially inwardly directed compressive forces on said gripping means from a plurality of regularly spaced angles around the periphery of the locking element;
   and means normally urging said gripping means to its inoperative disposition.

2. In the combination of claim 1 wherein:
   said locking element is composed of resilient material;
   said gripping means on the locking element comprises resilient means elastically deformable into said operative disposition and reformable into said inoperative disposition;
   said means for actuating said gripping means comprises means for elastically deforming said gripping means; and
   said means normally urging the gripping means to its inoperative disposition comprises the resilient material of which said gripping means is composed.

3. In the combination of claim 2 wherein:
   said locking element is composed of rigid, non-elastomeric material;
   said second portion on said tubular locking element terminates at an outer end;
   and said gripping means is located adjacent said outer end and comprises a plurality of elongated slots extending longitudinally from said outer end toward the first portion of said tubular locking element.

4. In the combination of claim 2 wherein:
   said tubular locking element is composed of material selected from the group consisting of rubber and elastomers.

5. In the combination of claim 4 wherein said tubular locking element comprises:
   a plurality of circumferential ridges on the inside of the tubular locking element.

6. In the combination of claim 4 wherein said tubular locking element comprises:
   a plurality of elongated ridges extending on the inside of the tubular locking element between said opposite ends.

7. In the combination of claim 1 wherein:
   said tubular actuating element is mounted for axial movement, relative to said locking element, between first and second positions for the actuating element;
   said means on said actuating element for engaging said elongated ridges comprises means for doing so in response to axial movement of the actuating element from its first to its second position;

and said combination comprises means for holding said actuating element in its second position.

8. In the combination of claim 7 wherein:
said actuating element comprises a tapered portion for engaging said gripping means to actuate the latter in response to axial movement of the actuating element from its first to its second position.

9. In the combination of claim 7 wherein:
said first portion on the tubular locking element terminates at an end located around said outer tubular member;
said actuating element has a pair of opposite ends one of which is located around said outer tubular member and spaced from said end on the first portion of the locking element in a direction away from the untelescoped part of the inner member;
and said holding means for the actuating element comprises means normally urging said actuating element toward its second position.

10. In the combination of claim 9 wherein said means normally urging said actuating element toward its second position comprises:
a coil spring having a pair of ends;
said coil spring surrounding said outer tubular member and located between (a) said end on the first portion of the locking element and (b) said one end on said actuating element;
first engaging means, at said end of the locking element's first portion, for engaging one end of said coil spring;
second engaging means, at said one end of said actuating element, for engaging the other end of said coil spring;
and means joining said second engaging means with said actuating element for movement thereof together.

11. In the combination of claim 10 wherein:
said tubular actuating element comprises a first part concentric with said outer tubular member and having a larger inside diameter than the outside diameter of the outer tubular member to accommodate said coil spring between the outer surface of the outer tubular member and the inner surface of said tubular actuating element;
and said second engaging means comprises an annular end cap located at said one end of said actuating element and slidable on said outer member.

12. In the combination of claim 11 wherein said annular end cap comprises:
an enlarged portion having an outside diameter greater than the inside diameter of the first part of said actuating element and engaging said actuating element at said one end of the latter;
and a reduced portion having an outside diameter less than the inside diameter of said first part of the actuating element for reception within the latter;
said second engaging means being a part of said reduced portion of the annular end cap.

* * * * *